J. H. GILL, J. D. REA & L. SANDERSON.
MOTOR TIRE COVER.
APPLICATION FILED JULY 15, 1918.

1,300,601.

Patented Apr. 15, 1919

Inventors
J. H. Gill
J. D. Rea
L. Sanderson

UNITED STATES PATENT OFFICE.

JOHN HARLEY GILL, JAMES DOUGLAS REA, AND LEONARD SANDERSON, OF DUNEDIN, NEW ZEALAND.

MOTOR-TIRE COVER.

1,300,601.        Specification of Letters Patent.      Patented Apr. 15, 1919.

Application filed July 15, 1918. Serial No. 244,996.

*To all whom it may concern:*

Be it known that we, JOHN HARLEY GILL, JAMES DOUGLAS REA, and LEONARD SANDERSON, subjects of King George V of Great Britain, residing at 40 Dowling street, Dunedin, in the Dominion of New Zealand, have invented certain new and useful Improvements in Motor-Tire Covers, of which the following is a specification.

The object of this invention is to provide a motor tire cover and an attachable wearing surface member, so that users will obtain from the said cover more mileage than would be obtainable from covers without the inclusion of the said wearing surface member.

A further object is to provide means for a rapid and easy attachment of the wearing surface member, so that it may be attached to the cover on the roadside if desired.

A feature of the invention is a locking bead member formed partially on the edges and partially on the internal surface of the attachable wearing surface member, and one or a series of lateral locking pieces formed on the under surface of the wearing surface member, reaching from edge to edge thereof, or partially across the said surface, and corresponding grooves formed in the main cover member with which the said bead member engages to form means of attachment.

Another feature of the invention is the particular design of fastener by which the attachable wearing surface member is additionally attached to the main tire cover.

In the drawings accompanying this specification:

Our tire is composed of two members, which will be hereinafter referred to as "the main cover member," and "the attachable wearing surface member."

The main cover member resembles an ordinary tire cover, with the addition that a groove 1 is formed in the walls 2 of the cover, and a lateral groove 3 is formed across the tread of the main cover.

Figure 1:
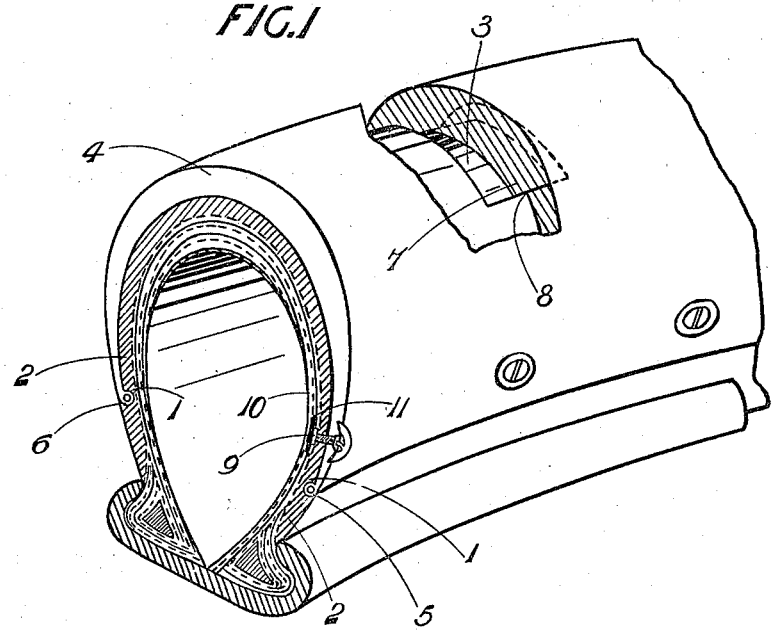
Figure 1 is a sectional view in perspective of the invention, a part of the portion in perspective being cut away to illustrate a lateral locking piece.
Figure 2:
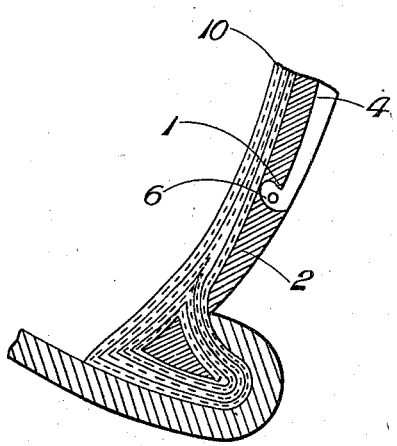
Fig. 2 is an enlarged sectional view of a portion of the motor tire cover and wearing surface member showing the locking bead member.

The attachable wearing surface member 4 is practically a substitute for re-tread, the member being provided with locking bead members 5 and 6, forming enlarged edges on each side of the attachable wearing surface member 4, and there is a second locking member 7 projecting from the inner surface 8 of the wearing surface member, which, on engaging with the groove 3 shown in Fig. 1, prevents circumferential slip, while the locking bead members 5 and 6 formed on the edges of the said wearing surface member 4 prevent lateral slip, in addition to forming attaching means of the said wearing member to the main cover member, and also provides a moisture and dust proof joint to exclude foreign elements from lodging between the adjoining surfaces.

Fasteners are provided as an additional means for attaching the wearing surface member to the wearing cover member. Each fastener comprises three members, one, a threaded nut member 9, which is let into the fabric 10, forming part of the construction of the main tire cover, and having means such as serrated edges shown at 11, the points thereof projecting at approximately right angles to the surface 12 of the nut member 9, to prevent the said nut member from turning on its seat.

The second is a screw member 13, threaded at 14, and provided with a head 15 and slot 16 therein, or suitable means to screw the said second member into the nut member to attach the said wearing surface member to the main cover member for additional security.

Figure 3:
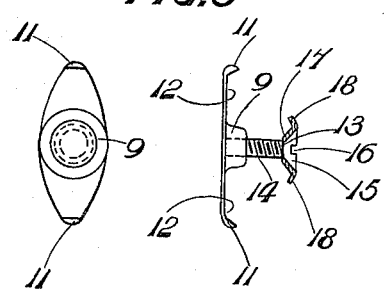
Fig. 3 is an illustration of the fastener.

The washer 17, being the third member of the fastener, is countersunk to suit the head 15 of the screw 14, and is provided with a flange dished as in the manner indicated at 18, Fig. 3, so that when the said head is screwed home, the edges of the flange 18 sink into the material of the wearing surface member 4, and form a dust and moisture proof joint, and thus prevent elements from penetrating through the hole made for the screw 14 and lodging between the adjoining surfaces of the main cover and the wearing surface member.

Having thus described our present invention, what we claim as new and desire to protect by Letters Patent is:—

The combination with a casing provided upon its tread surface with lateral spaced recesses and upon its opposite sides and near its beads with annular grooves; of an attaching wearing surface member provided at its tread portion with inwardly projecting spaced projections which snugly fit in the recesses, the edges of the attaching wearing surface member being provided with inwardly extending locking beads which fit in said grooves; and attaching means for securing the wearing surface member to the casing, said attaching elements being arranged inwardly of and near said locking beads.

In witness whereof we affix our signatures.

JOHN HARLEY GILL.
JAS. DOUGLAS REA.
LEONARD SANDERSON.

Witnesses:
  MABEL McKEEMAN,
  ROBERT PARK, Jr.